United States Patent
Dick et al.

(10) Patent No.: US 7,861,805 B2
(45) Date of Patent: Jan. 4, 2011

(54) CONFORMAL BEARING FOR ROCK DRILL BIT

(75) Inventors: Aaron J. Dick, Houston, TX (US); Chih Lin, Spring, TX (US); Terry J. Kolterman, The Woodlands, TX (US); Anton F. Zahradnik, Sugar Land, TX (US); Dan E. Scott, Montgomery, TX (US); Don Q. Nguyen, Houston, TX (US); Eric Sullivan, Houston, TX (US); Scott Shiqiang Shu, Spring, TX (US); Craig Hodges Cooley, Saratoga Springs, TX (US); Timothy Nathan Sexton, Santaquin, UT (US)

(73) Assignees: Baker Hughes Incorporated, Houston, TX (US); US Synthetic Corporation, Orem, UT (US)

( * ) Notice: Subject to any disclaimer, the term of this patent is extended or adjusted under 35 U.S.C. 154(b) by 191 days.

(21) Appl. No.: 12/121,296

(22) Filed: May 15, 2008

(65) Prior Publication Data

US 2009/0283332 A1 Nov. 19, 2009

(51) Int. Cl.
*E21B 10/22* (2006.01)
(52) U.S. Cl. .................................. 175/371; 175/372
(58) Field of Classification Search .................. 175/371, 175/372
See application file for complete search history.

(56) References Cited

U.S. PATENT DOCUMENTS

| | | |
|---|---|---|
| 3,384,426 A | 5/1968 | Schumacher, Jr. |
| 3,890,018 A | 6/1975 | Clamon |
| 4,204,437 A | 5/1980 | Espana |
| 4,220,377 A | 9/1980 | Phelps |
| 4,244,430 A * | 1/1981 | Raiburn ................ 175/227 |
| 4,252,383 A * | 2/1981 | Simpson ................ 384/93 |
| 4,277,110 A * | 7/1981 | Fox ...................... 384/94 |
| 4,279,316 A * | 7/1981 | Helmick ................ 175/371 |
| 4,334,586 A | 6/1982 | Schumacher |
| 4,403,812 A | 9/1983 | Stephan |
| 4,627,882 A | 12/1986 | Soderstrom |
| 4,756,631 A | 7/1988 | Jones |
| 5,092,687 A | 3/1992 | Hall |
| 5,201,795 A | 4/1993 | Howard et al. |
| 5,975,223 A | 11/1999 | Karlsson |

(Continued)

FOREIGN PATENT DOCUMENTS

JP 2007327278 A 12/2007

OTHER PUBLICATIONS

Fang, Z., et al., Chipping Resistant Polycrystalline Diamond and Carbide Composite Materials for Roller Cone Bits, SPE International, SPE 71394, 2001.

(Continued)

*Primary Examiner*—William P Neuder (57) ABSTRACT

A rock drilling bit having PDC radial bearings has journal and cone bearing surfaces with increased contact area to increase load support. The radius of curvature of the bearing pin journal and cone bearing surfaces are matched or conformed on the bearing pressure side. The conformal journal surfaces may be formed on the main journal bearing, the pilot pin radial bearing, or both surfaces. In addition, diamond inlays may be located on the bearing surfaces of the cone, the bearing pin, or both components.

17 Claims, 5 Drawing Sheets

U.S. PATENT DOCUMENTS

| | | | |
|---|---|---|---|
| 6,209,185 B1 | 4/2001 | Scott | |
| 6,398,400 B1 | 6/2002 | Nienhaus | |
| 6,431,758 B1 | 8/2002 | Lyon et al. | |
| 6,637,528 B2 | 10/2003 | Nishiyama et al. | |
| 7,086,487 B2 * | 8/2006 | Nguyen | 175/371 |
| 7,128,171 B2 | 10/2006 | Dick et al. | |
| 7,270,197 B2 | 9/2007 | Puttmann | |
| 2006/0249311 A1 | 11/2006 | Thuresson et al. | |
| 2007/0046119 A1 | 3/2007 | Cooley | |
| 2009/0205873 A1 * | 8/2009 | Dick et al. | 175/371 |

OTHER PUBLICATIONS

Duan, L.C., et al., Research on Diamond-Enhanced Tungsten Carbide Composite Button Bits, Elsevier, Journal of Materials Processing Technology 129 (2002) 395-98.

International Search Report for PCT/US2009/043940 dated Oct. 30, 2009, 10 pages.

* cited by examiner

PS & NPS RADIUS EQUAL

FIG. 7

PS RADIUS > NPS RADIUS

FIG. 8

PS RADIUS > NPS RADIUS

FIG. 9

PS RADIUS < NPS RADIUS

FIG. 10

CONFORMAL BEARING FOR ROCK DRILL BIT

BACKGROUND OF THE INVENTION

1. Technical Field

The present invention relates in general to rock drill bits and, in particular, to an improved system, method, and apparatus for conformal bearings in rock drill bits.

2. Description of the Related Art

Rolling cone earth boring bits have a bit body that typically has three bit legs which extend downward from the body. A bearing pin extends inward and downward from each bit leg. A conventional rock bit bearing pin is cylindrical and rotatably receives a cone. There are several varieties of bearing systems used to support the cone. These bearing systems typically consist of a combination of radial and thrust bearings that may be either sealed and lubricated or unsealed and open to the drilling fluid. The contacting wear surfaces may consist of wear-resistant metals or non-metals such as tungsten carbide and/or diamond, and may engage through sliding and/or rolling. Open bearings may contain ports to force drilling fluid through the bearing system to lubricate and cool the wear surfaces.

The cones have teeth or compacts on their exteriors for disintegrating earth formations as the cones rotate on the bearing pins. A sealed, grease-lubricated bearing drill bit contains a lubricant reservoir in the bit body that supplies lubricant to the bearing pins. A seal prevents debris from contaminating the bearing and also blocks the lubricant from leaking to the exterior. When operated in a borehole filled with liquid, hydrostatic pressure acts on the drill bit as a result of the weight of the column of drilling fluid. Each bearing pin has a pressure compensation system that is mounted in the lubricant reservoirs in the bit body. A lubricant passage extends from the reservoir of the compensator to an exterior portion of the bearing pin. The pressure compensation system has a communication port that communicates with the hydrostatic pressure on the exterior to equalize the pressure on the exterior with lubricant pressure in the passages and clearances within the drill bit. The viscous lubricant creates hydrodynamic lift as the cone rotates on the bearing pin so that the load is partially supported by lubricant fluid film and partially by surface asperity to surface asperity contact.

A polycrystalline diamond compact (PDC) bearing is a type of open bearing system. The bearing pin and cone contain discreet PDC elements placed in a circumferential array on the radial bearing and in a planar array on the thrust bearing. The PDC elements on the cone slidingly engage the PDC elements on the bearing pin. Drilling fluid is driven through the bearing to cool and to lubricate the bearing. In this type of bearing system, load is supported almost entirely by surface asperity contact. Drill bits of this nature operate under extreme conditions. Very heavy weights are imposed on the drill bit to facilitate the cutting action, and friction causes the drill bit to generate heat. In addition, the temperatures in the well can be several hundred degrees Fahrenheit. Improvements in cutting structure have allowed drill bits to operate effectively for much longer periods of time than in the past. Engineers involved in rock bit design continually seek improvements to the bearings to avoid bearing failure before the cutting structure wears out.

Figure 1:
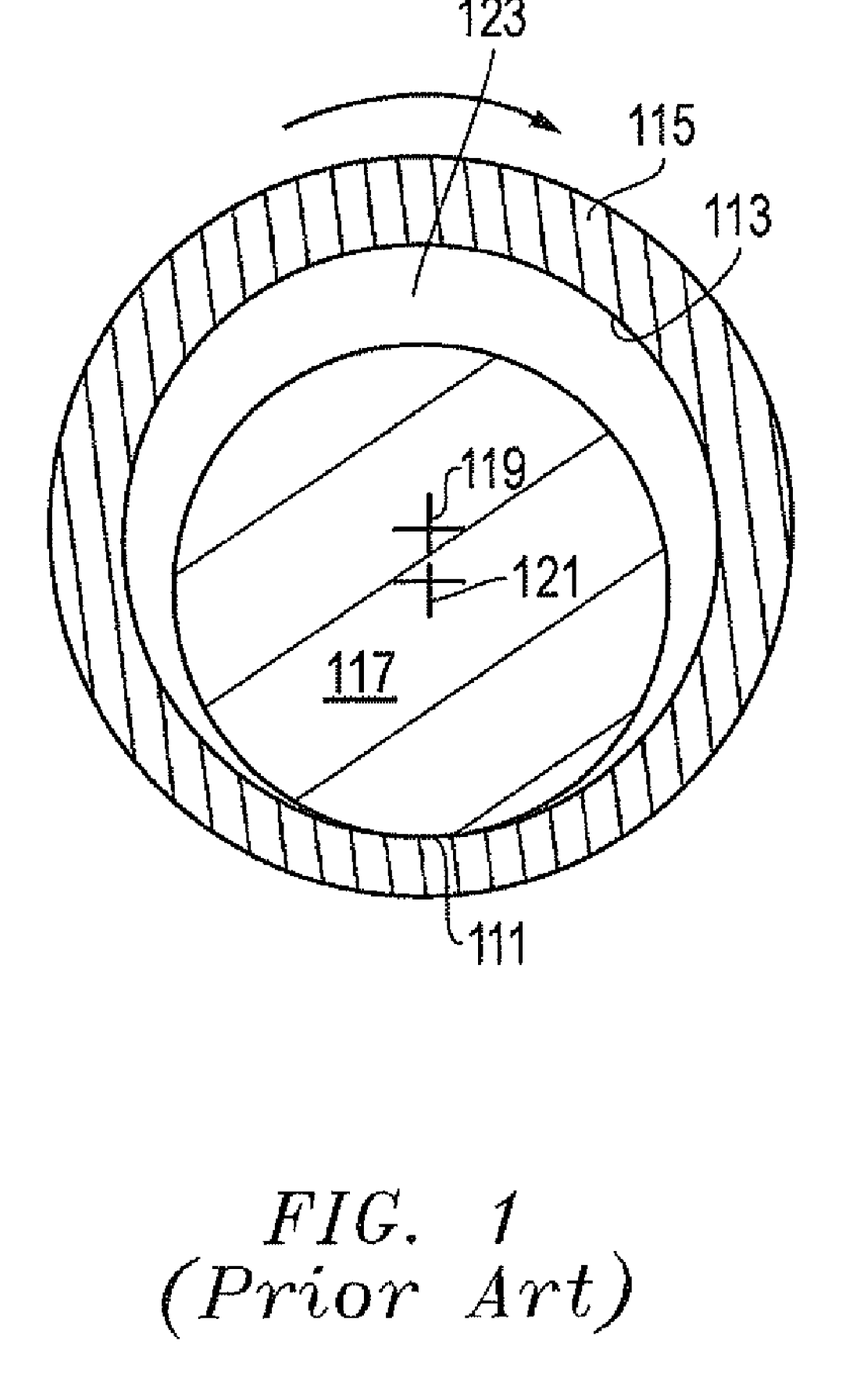
FIG. 1 is a sectional view of a conventional journal bearing for a rotating cone drill bit.

In conventional bits (FIG. 1), even though the clearance 111 between the cavity 113 of the cone 15 and the bearing pin 117 is quite small, the high load imposed on the drill bit causes the axis 119 of the cone 115 to translate eccentrically relative to the axis 121 of the bearing pin 117. The clearance 111 is smaller on the lower side of the bearing pin 117 than the clearance 123 (e.g., 0.006 in) on the upper side of the bearing pin 117. At high loads, the clearance 111 between the lower side of bearing pin 117 and cone 115 is reduced to zero and surface asperity to surface asperity contact occurs. The different radii of bearing pin 117 and cone 115 cause the surface asperity to surface asperity contact to be concentrated in a small area on the lower side of bearing pin 117. The concentrated contact load creates large stress and temperature gradients that can lead to bearing failure.

There has been a variety of patented proposals to address this issue. For example, U.S. Pat. No. 4,403,812 discloses the use of an elastomeric suspension around the ball bearing race to take up bearing play. This compliant suspension allows the bearing elements to self-align. Other techniques have called for pre-wearing the bearings to increase surface contact area, and modifying the PDC element size and shape. Although each of these designs is workable, an improved solution that overcomes the limitations of the prior art would be desirable.

SUMMARY OF THE INVENTION

Embodiments of a system, method, and apparatus for rock drilling bit comprises improved radial bearings that maximize the contact area between the journal and cone bearings and, thus, maximizes load support. The radius of curvature of the journal and cone bearing are matched or conformed to greatly increase the apparent contact surface area on the pressure side of the bearing. The conformal radial bearing matches the journal and cone bearing radius on the bearing pressure side. This design reduces thermal fatigue cracks compared to conventional, completely cylindrical designs. The conformal journal surfaces may be formed on the main journal bearing, the pilot pin radial bearing, or both surfaces. In addition, diamond inlays or particles may be located on the bearing surfaces of the cone, the bearing pin, or both components.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 2:
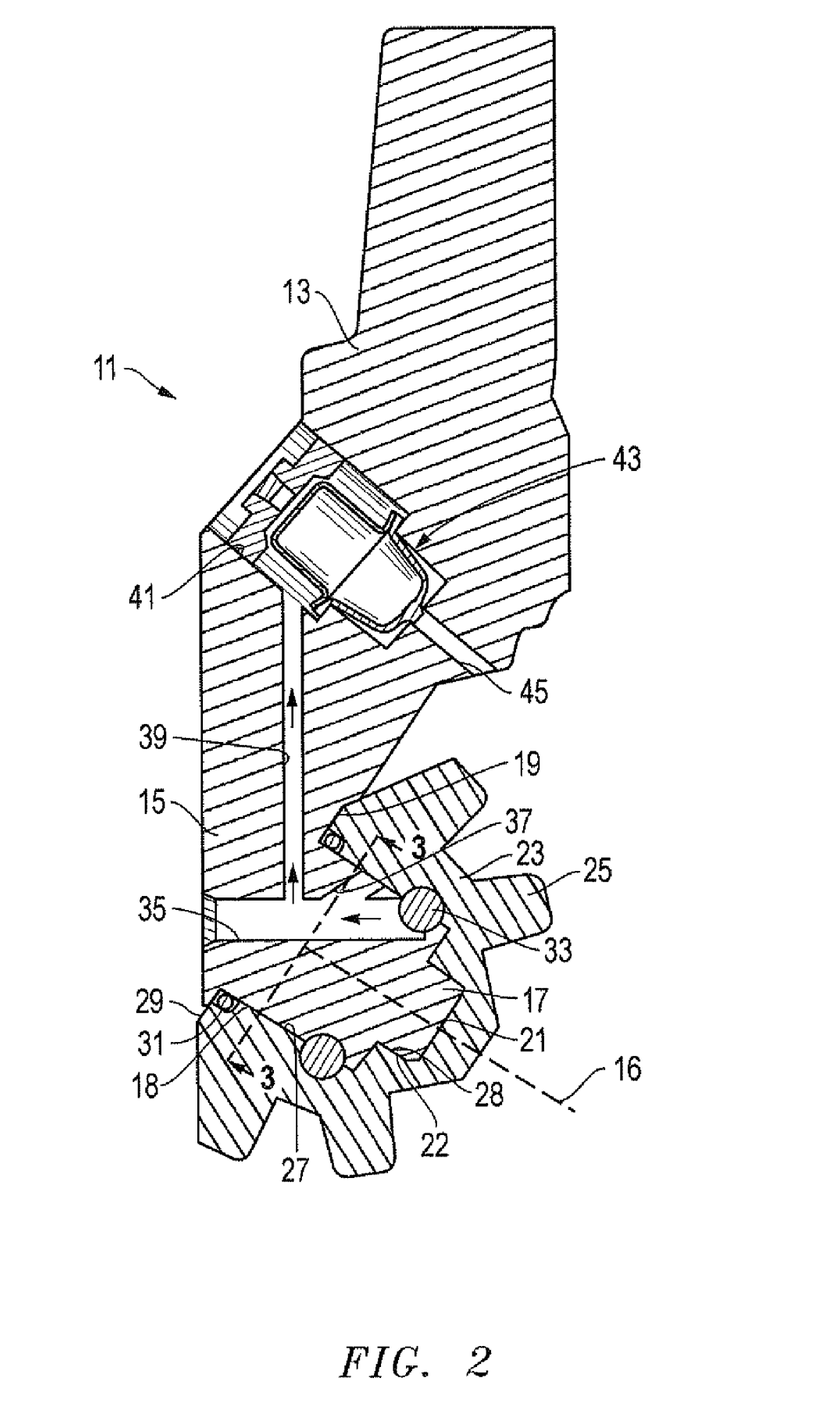
FIG. 2 is a quarter-sectional view of an earth boring drill bit constructed in accordance with the invention.

Referring to FIG. 2, a bit 11 has a body 13 at an upper end that is threaded (not shown) for attachment to the lower end of a drill string. Body 13 has at least one bit leg 15, typically three, which extend downward from it. Each bit leg 15 has a bearing pin 17 that extends downward and inward along an axis 16. Bearing pin 17 has an outer end, referred to as last machined surface 19, where it joins bit leg 15. Bearing pin 17 has a main journal surface 18 and a nose 21 having a smaller diameter than surface 18 that is formed on its inner end. Nose 21 also has a pilot pin radial bearing surface 22 that is parallel to surface 18 relative to axis 16.

A cone 23 rotatably mounts on bearing pin 17. Cone 23 has a plurality of protruding teeth 25 or compacts (not shown). Cone 23 has a cavity 27 that is slightly larger in diameter than the outer diameters of bearing pin 17. Cone 23 has a back face 29 that is located adjacent, but not touching, last machined surface 19. If the bearing type is a sealed, lubricated bearing, a seal 31 is located in a seal cavity adjacent to the back face 29. Seal 31 may be of a variety of types, and in this embodiment is shown to be as an o-ring. Seal 31 engages a gland or area of bearing pin 17 adjacent to last machined surface 19. Other types of seals such as dual seals, seals with non-circular cross-sectional shapes, etc., also may be used.

Cone 23 may be retained in more than one manner. In the embodiment shown, cone 23 is retained on bearing pin 17 by a plurality of balls 33 that engage a mating annular recess formed in cone cavity 27 and on bearing pin 17. Balls 33 lock cone 23 to bearing pin 17 and are inserted through a ball passage 35 during assembly after cone 23 is placed on bearing pin 17. Ball passage 35 extends to the exterior of bit leg 15 and may be plugged as shown after balls 33 are installed.

A portion of cavity 27 slidingly engages journal surfaces 18 and 22. In one embodiment, the outer end of journal surface 18 is considered to be at the junction with the gland area engaged by seal 31, and the inner end of journal surface 18 is considered to be at the junction with the groove or race for balls 33. Journal surfaces 18 and 22 serve as a journal bearing for loads imposed along the axis of bit 11.

In sealed, lubricated bearings, a first lubricant port 37 is located on an exterior portion of journal surface 18 of bearing pin 17. In one embodiment, first port 37 is located on the upper or unloaded side of journal surface 18 of bearing pin 17 between balls 33 and seal 31. When viewed from nose 21 (FIG. 2), the first port 37 is shown at zero degrees to vertical (FIG. 3), which is top dead center. First port 37 could be on other areas of journal surface 18, but may be located in the range from zero to 90 degrees. First port 37 is connected to a first passage 39 (FIG. 2) via ball passage 35. First passage 39 leads to a lubricant reservoir 41 that contains a lubricant.

Lubricant reservoir 41 may be of a variety of types. In one embodiment, an elastomeric diaphragm 43 separates lubricant in lubricant reservoir 41 from a communication port 45 that leads to the exterior of bit body 13. Communication port 45 communicates the hydrostatic pressure on the exterior of bit 11 with pressure compensator 43 to reduce and preferably equalize the pressure differential between the lubricant and the hydrostatic pressure on the exterior.

Figure 3:
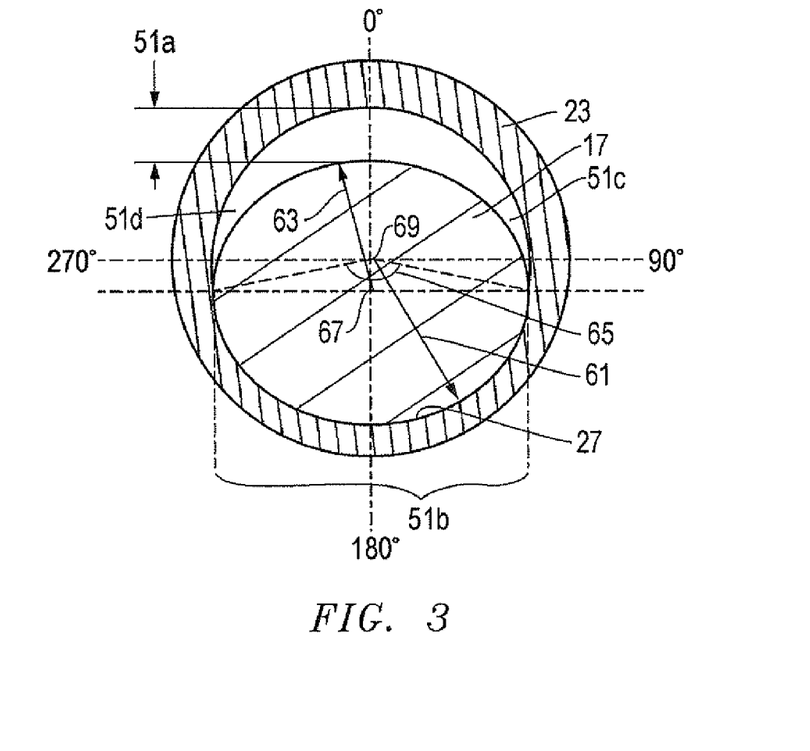
FIG. 3 is a sectional view of a bearing pin and cone on the drill bit of FIG. 2 taken along the line 3-3 of FIG. 2, and is constructed in accordance with the invention.

The precise positioning between bearing pin 17 and cone 23 varies as the drill bit 11 is loaded during service, thereby creating eccentricity. The eccentricity is a result of the difference between the outer diameter of journal surfaces 18 and 22 and the inner diameter of cone cavity 27. FIG. 3 shows the annular clearance 51 greatly exaggerated for illustration purposes. In actuality, annular clearance 51 is quite small, typically being no more than about 0.006 inches on a side. Annular clearance 51 may be the same as in the prior art bits of this type.

Under load, there is a difference between axis 16 (FIG. 2) of bearing pin 17 and the axis of cone 23. A particular bit 11 will have a maximum theoretical eccentric distance between the axes of the pin and cone based on a maximum load. In operation, there is an actual eccentric distance between the axes based on the actual load. The eccentricity ratio is the actual eccentric distance under a given load divided by the maximum eccentric distance possible. Under high loads, there is some elastic deformation of bearing pin 17 and cone 23. The eccentricity ratio of bit 11 during operation may vary between about 0.9 to slightly greater than 1.0.

Even though annular clearance 51 is very small, it is required to allow assembly of cone 23 on bearing pin 17 and to allow for differences in thermal expansion during service. The annular space 51 has a largest width or clearance point 51*a* at approximately 0° (i.e., top dead center). A minimum width or clearance span 51*b* extends on both sides of a position at approximately 180° due to the downward force imposed on the bit during drilling.

Assuming cone 23 rotates clockwise in FIG. 3, in one embodiment clearance 51 has a converging region 51*c* from 0° to the region of minimum clearance at approximately 90° where the annular space for the lubricant gradually gets smaller. Clearance 51 has a diverging region 51*d*, from approximately 270° to 0° where the annular space for the lubricant gets gradually larger. The minimum clearance span 51*b* is effectively zero other than the lubricant film thickness between bearing pin 17 and cone 23. During operation, at times the minimum clearance region 51*b* may reach zero, but normally does not remain at zero. The converging region 51*c* ends at minimum clearance span 51*b*, and the diverging region 51*d* begins at minimum clearance span 51*b*.

In one embodiment, the invention comprises an earth boring bit 11 (FIG. 2) having a bit body 13 with at least one depending leg 15. A bearing pin 17 extends from the leg 15 and has journal surfaces 18, 22 with shapes that are not perfectly circular designs with regard to their cross-sectional shapes (i.e., slightly rotationally asymmetrical about axis 16, which may comprise the center axis of the bearing pin in some embodiments). A rotatable cone 23 has a cylindrical cavity 27, 28 that fits slidingly on and directly engages the journal surface of the bearing pin. The journal surface comprises a main journal bearing surface 18 on a proximal end of the bearing pin 17, and a pilot pin radial bearing surface 22 on a distal end of the bearing pin 17. Both the main journal bearing surface 18 and the pilot pin radial bearing surface 22 may incorporate designs that are not perfectly or completely circular in cross-section (i.e., they are non-circular or not quite rotationally symmetrical about axis 16). In some embodiments, the term "rotationally asymmetric" encompasses any bearing wherein a portion of the mating surfaces have a minimum clearance space as described herein.

Figure 4:
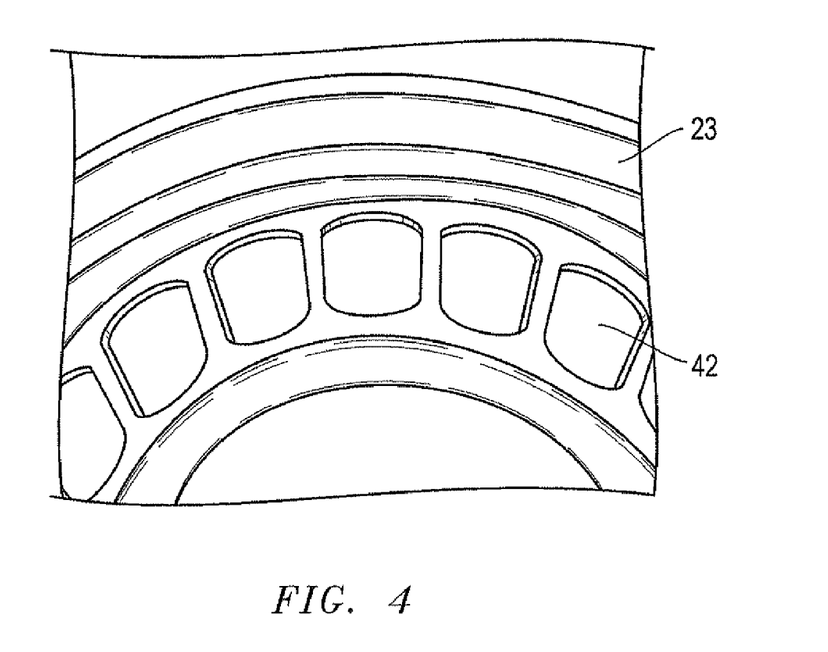
FIG. 4 is a partial isometric view of an interior of a cone that is constructed in accordance with the invention.

Optionally, the invention may further comprise a material 42 (FIG. 4) such as metal (e.g., powdered metallurgy), diamond inlays, diamond particles, tungsten carbide, polycrystalline diamond and diamond-enhanced carbide wear surfaces located on at least one of the journal surface of the bearing pin 17 and the cylindrical cavity of the cone 23.

Figure 5:
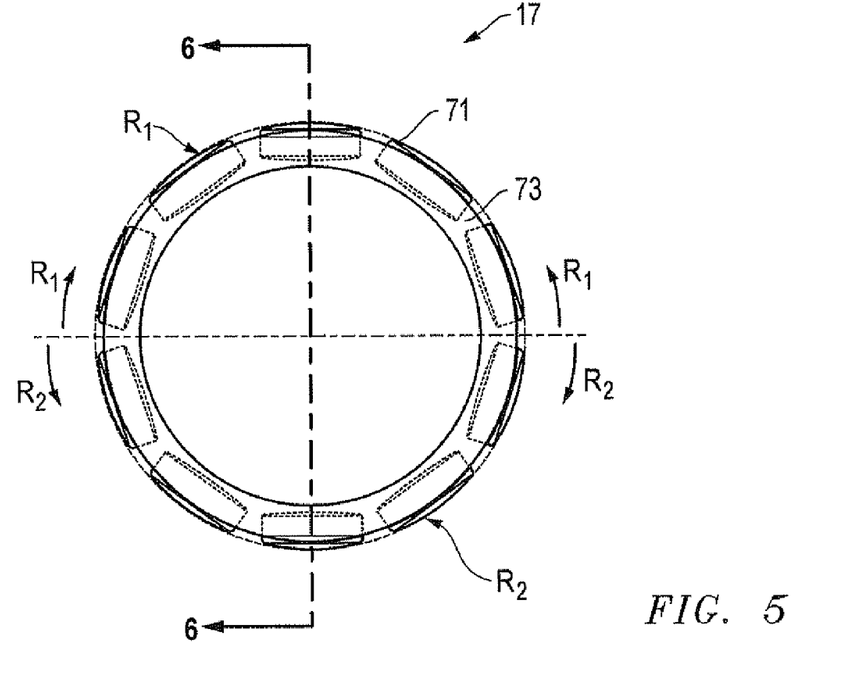
FIG. 5 is a sectional end view of one embodiment of a bearing pin constructed in accordance with the invention.
Figure 6:
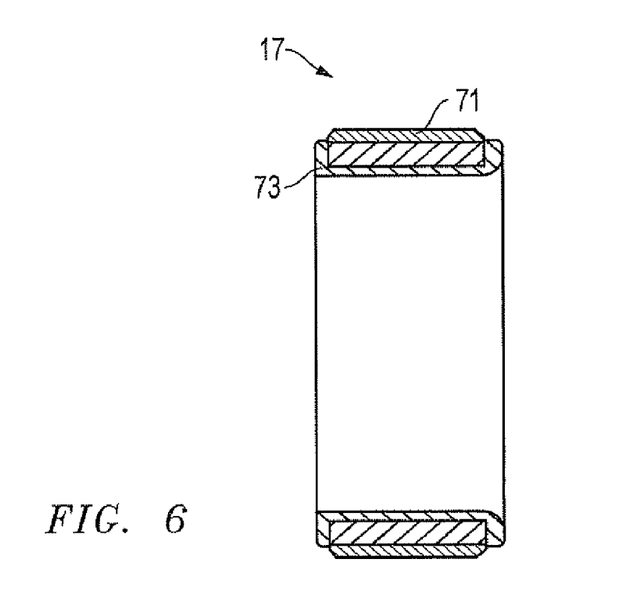
FIG. 6 is a sectional side view of the bearing pin of FIG. 5, taken along the line 6-6 of FIG. 5, and is constructed in accordance with the invention.

As shown in FIGS. 5 and 6, such materials 71 also may be formed on and/or incorporated into one or more surfaces 18, 22 of the bearing pin 17. For example, the materials 71 may include those described above, including a plurality of polycrystalline diamond bearing elements or inserts (e.g., assembled into a ring on a steel carrier ring 73), wherein the bearing surfaces are formed or machined to different radii. This bearing surface configuration may embody any of the variations described herein. In the embodiment shown, the two radii, $R_1$ and $R_2$, have the same center but $R_1 < R_2$.

In the illustrated embodiment of FIG. 3, the journal surface 18 and/or 22 comprises a "pressure side" or direct contact surface (adjacent span 51$b$) formed at a first radius 61. A "non-pressure side" or non-contact surface (adjacent areas 51$a$, $c$, $d$) is formed at a second radius 63 that is shorter than the first radius 61.

The cylindrical cavity 27 defines a maximum potential contact area having an angular span of approximately 180° as shown in FIG. 3. In one embodiment, the direct contact surface 51$b$ spans an angle 65 of at least 130° of said maximum potential contact area. The radial center 67 of the bearing pin 17 may be eccentric to a radial center 69 of the cone 23 (and the radial center of radius 61). This offset may comprise approximately the value of the radial bearing clearance. Alternatively, the bearing pin may be formed at two or more radii that originate from the same radial center. In still another alternative, only a portion 51$b$ of the journal surface 18, 22 may be formed at the radius 61 that matches the radius of the cylindrical cavity 27.

Figure 7:
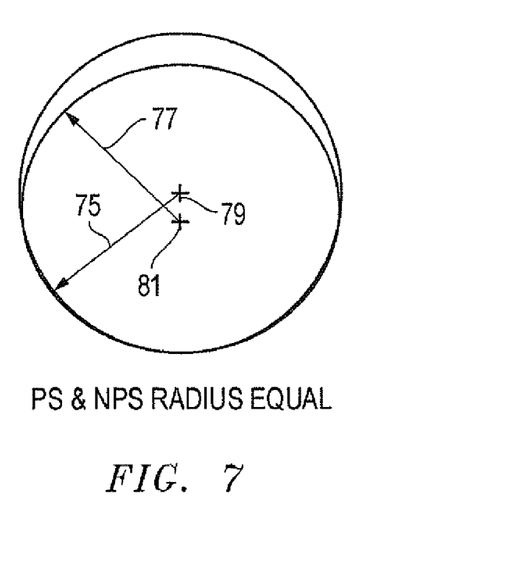
FIGS. 7-10 are schematic sectional views of some embodiments of drill bit bearing pins and cones constructed in accordance with the invention.
Figure 8:
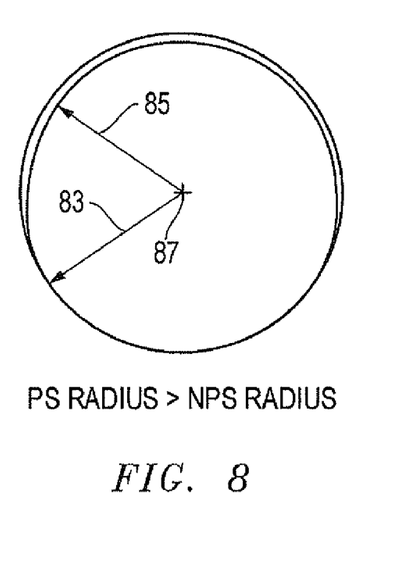
Figure 9:
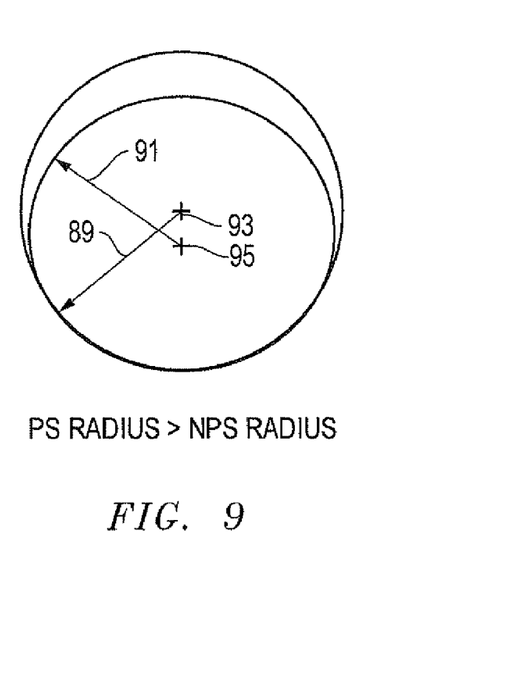
Figure 10:
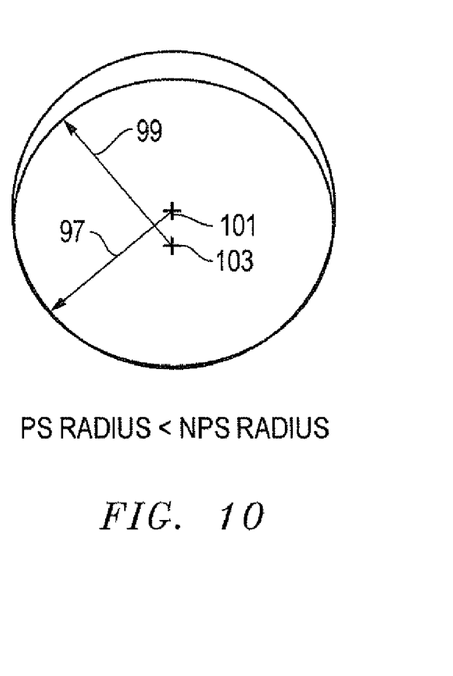

In alternate embodiments (e.g., FIGS. 7-10), the second radius may be equal to or greater than first radius 61. For example, FIG. 7 depicts an embodiment wherein the pressure and non-pressure sides of the pin have equal radii 75, 77 (e.g., 0.990 inches) that originate from different centers 79, 81, respectively. FIG. 8 illustrates an embodiment wherein pressure side radius 83 (e.g., 0.990 inches) is greater than non-pressure side radius 85 (e.g., 0.950 inches), but they originate from the same center 87. FIG. 9 depicts an embodiment where the pressure side radius 89 (e.g., 0.990 inches) is greater than the non-pressure side radius 91 (e.g., 0.950 inches), and they originate from different centers 93, 95, respectively. FIG. 10 illustrates an embodiment where the pressure side radius 97 (e.g., 0.990 inches) is less than the non-pressure side radius 99 (e.g., 1.030 inches), and they originate from different centers 101, 103, respectively.

In another embodiment, the zero clearance conforming bearing surfaces are created in combination with spherical bearing surface curvature to further increase bearing contact area under conditions when the cone misaligns on the bearing pin.

While the invention has been shown or described in only some of its forms, it should be apparent to those skilled in the art that it is not so limited, but is susceptible to various changes without departing from the scope of the invention.

What is claimed is:

1. An earth boring bit, comprising:
a bit body having at least one depending leg;
a bearing pin extending from the leg and having an axis and a journal surface that is rotationally asymmetric about the axis from an outer end of the journal surface at a junction with a gland area engaged by a seal, to an inner end at a junction with a race for balls; and
a cone having a cavity slidingly mounted to the journal surface of the bearing pin and being rotatable relative to the bearing pin; and
the journal surface comprises a main journal bearing surface on a proximal end of the bearing pin, and a pilot pin radial bearing surface on a distal end of the bearing pin, and both the main journal bearing surface and the pilot pin radial bearing surface are rotationally asymmetric about the axis.

2. A bit according to claim 1, further comprising a material selected from the group consisting of diamond inlays, diamond particles, tungsten carbide, polycrystalline diamond and diamond-enhanced carbide wear surfaces located on at least one of the journal surface of the bearing pin and the cavity of the cone.

3. A bit according to claim 1, wherein the journal surface comprises a direct contact surface formed at a first radius, and a non-contact surface formed at a second radius that is selected from the group consisting of equal to, longer than, and shorter than the first radius.

4. A bit according to claim 3, wherein the cavity is cylindrical and defines a maximum potential contact area having an angular span of 180°, and the direct contact surface spans at least 130° of said maximum potential contact area.

5. A bit according to claim 3, wherein the first radius is formed from a first radial center and the second radius is formed from a second radial center, and the first and second radial centers are selected from the group consisting of a same location and a different location.

6. A bit according to claim 1, wherein a radial center of the bearing pin is eccentric to a radial center of the cone by approximately 0.006 inches.

7. A bit according to claim 1, wherein only a portion of the journal surface is formed at a radius that matches a radius of the cavity.

8. An earth boring bit, comprising:
a bit body having at least one depending leg;
a bearing pin extending from the leg and having an axis and a journal surface that is rotationally asymmetric about the axis, the journal surface comprises a main journal bearing surface on a proximal end of the bearing pin, and a pilot pin radial bearing surface on a distal end of the bearing pin, and both the main journal bearing surface and the pilot pin radial bearing surface are rotationally asymmetric about the axis; and
a cone having a cylindrical cavity slidingly mounted to and engaging the journal surface of the bearing pin, the cone being rotatable relative to the bearing pin; and
the journal surface comprises a direct contact surface formed at a first radius, a non-contact surface formed at a second radius that is selected from the group consisting of equal to, longer than, and shorter than the first radius, the cylindrical cavity defines a maximum potential contact area having an angular span of 180°, and the direct contact surface spans at least 130° of said maximum potential contact area.

9. A bit according to claim 8, further comprising a material selected from the group consisting of diamond inlays, diamond particles, tungsten carbide, polycrystalline diamond and diamond-enhanced carbide wear surfaces located on at least one of the journal surface of the bearing pin and the cylindrical cavity of the cone.

10. A bit according to claim 8, wherein the first radius is formed from a first radial center and the second radius is formed from a second radial center, and the first and second radial centers are selected from the group consisting of a same location and a different location.

11. A bit according to claim 8, wherein a radial center of the bearing pin is eccentric to a radial center of the cone by approximately 0.006 inches.

12. A bit according to claim 8, wherein only a portion of the journal surface is formed at a radius that matches a radius of the cylindrical cavity.

13. An earth boring bit, comprising:
a bit body having at least one depending leg;
a bearing pin extending from the leg and having an axis and a journal surface that is rotationally asymmetric about the axis, the journal surface comprises a main journal bearing surface on a proximal end of the bearing pin, and a pilot pin radial bearing surface on a distal end of the bearing pin, and both the main journal bearing surface and the pilot pin radial bearing surface are rotationally asymmetric about the axis; and
a cone having a cylindrical cavity that fits slidingly on and directly engages the journal surface of the bearing pin, and only a portion of the journal surface is formed at a radius that matches a radius of the cylindrical cavity, the cone being rotatable relative to the bearing pin.

14. A bit according to claim 13, further comprising a material selected from the group consisting of diamond inlays, diamond particles, tungsten carbide, polycrystalline diamond and diamond-enhanced carbide wear surfaces located on at least one of the journal surface of the bearing pin and the cylindrical cavity of the cone.

15. A bit according to claim 13, wherein the journal surface comprises a direct contact surface formed at a first radius, and a non-contact surface formed at a second radius that is selected from the group consisting of equal to, longer than, and shorter than the first radius.

16. A bit according to claim 15, wherein the cylindrical cavity defines a maximum potential contact area having an angular span of 180°, and the direct contact surface spans at least 130° of said maximum potential contact area.

17. A bit according to claim 15, wherein the first radius is formed from a first radial center and die second radius is formed from a second radial center, and the first and second radial centers are selected from the group consisting of a same location and a different location.

* * * * *